June 26, 1956 — J. STRATHAUS — 2,751,951
ROAST BOARD
Filed Dec. 31, 1953
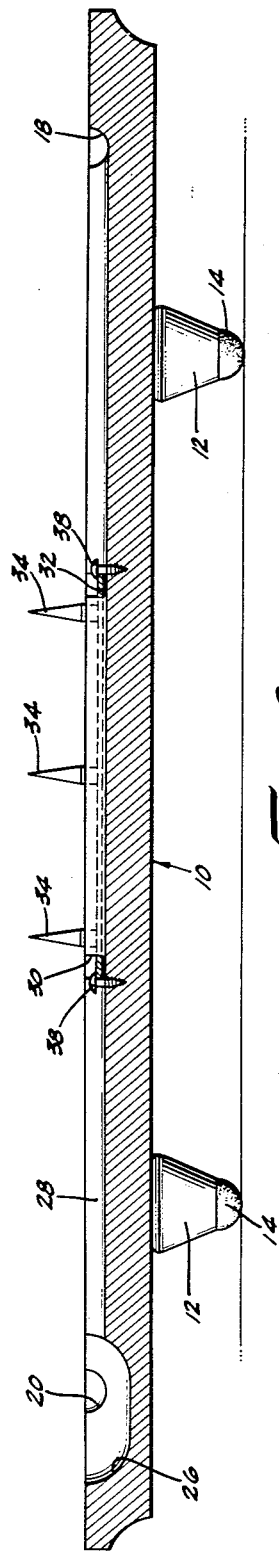
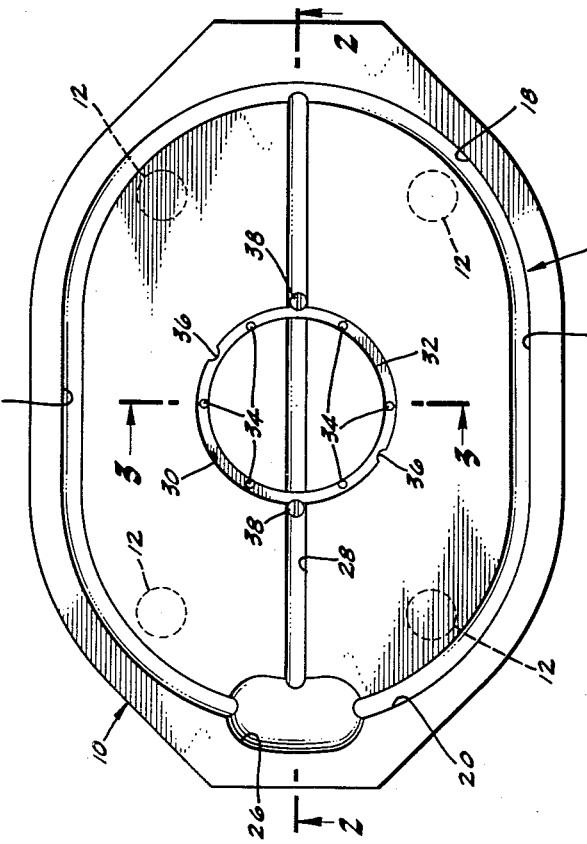
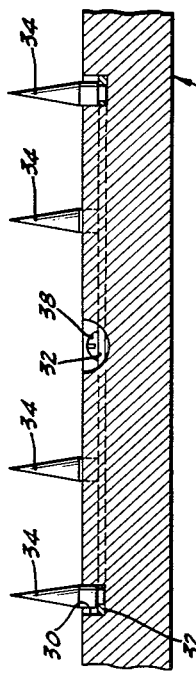
JOHN STRATHAUS
INVENTOR.
BY *Lyon & Lyon*
ATTORNEYS

United States Patent Office 2,751,951
Patented June 26, 1956

2,751,951

ROAST BOARD

John Strathaus, Granada Hills, Calif.

Application December 31, 1953, Serial No. 401,595

3 Claims. (Cl. 146—215)

This invention relates to an improved roast board.

It is an object of this invention to provide a roast board upon which meat to be carved is removably secured.

It is a further object of this invention to provide such a roast board wherein suitable means are provided for draining off juices from the meat.

It is a further object of this invention to provide a roast board wherein means are provided for rotatably mounting meat to be carved on the board thereby permitting shifting the position of the meat without shifting the platter.

It is still a further object of this invention to provide means for rotably securing meat to a roast board which is readily removable to facilitate cleaning of said means and said board.

Other objects and advantages will be readily apparent from the following description:

In the drawings:

Figure 1 is a top plan view of the roast board.

Figure 2 is a section taken along line 2—2 of Figure 1.

Figure 3 is a section taken along line 3—3 of Figure 1.

Figure 4 is a perspective view of the meat mounting means.

The platter or board 10 may be of any suitable material, preferably of a suitable wood and is supported by four legs 12 having rubber tips 14.

The board may be shaped in any desirable manner, as the usual platter and is substantially larger than the roast or other meat to be carved. Adjacent the periphery of the board 10 is a juice directing groove 16. In this embodiment the groove is formed from a pair of semi-circular arcs 18 and 20, connected by a pair of straight sections 22 and 24. The groove 16 is inclined from a high point in the middle of arc 18 to a low point in the middle of arc 20, so that gravy or juices from the meat being carved accumulate in a reservoir 26 formed at the lowest point in arc 20, permitting the gravy or juice to be removed by a spoon.

A transverse groove 28 bisects the groove 16 and runs beneath the meat supporting means for the same purpose as groove 16.

Centrally located on the platter bisected by groove 28 is an annular recess 30. This annular recess removably receives ring 32 of the meat mounting means. Suitably mounted upon the upper surface of ring 32 are a plurality of prongs 34, spaced an equidistance from one another. Although six such prongs are illustrated it is readily apparent their number and arrangement may be altered.

Means are provided to lock ring 32 in the recess 30. In this embodiment the ring has locking notches 36 formed on the outer periphery. A pair of screws 38 are screwed into the groove 28 with the heads thereof above the bottom of the groove at least the width of the ring 32. When the ring is inserted into recess 30 the notches 36 correspond with screws 38, permitting lowering of the ring. The ring is then rotated so that the heads of the screws overlap ring 32 and prevent upward movement thereof without interfering with the rotation of the ring.

In operation, the ring 32 is inserted into groove 16 so that prongs 34 project above the surface of board 10. Meat to be carved is impaled upon the prongs. The meat is then carved with the gravy and juices accumulating in reservoir 26. When it is desired to shift the position of the meat it is rotated, which rotates ring 32 in recess 30. The prongs 34 prevent slippage of the meat during the carving process. When it is desired to clean the roast board, the ring 32 is removed from recess 30 and all parts of the structure are readily accessible.

While what hereinbefore has been described is the preferred embodiment of this invention, it is readily apparent that alterations and modifications can be resorted to without departing from the scope of this invention, and such alterations and modifications are intended to be included within the scope of the appended claims.

I claim:

1. A roast board comprising: a board having an annular recess therein, a ring removably positioned in said recess, a plurality of prongs mounted upon said ring projecting above the surface of said board, and screws on said board, the heads of said screws overlapping said ring, said ring having notches therein permitting removal of said ring when aligned therewith.

2. A roast board comprising: a board having an annular recess therein, a prong retaining member removably positioned in said recess with the prongs projecting above the surface of said board, and screws in said board, the heads of said screws projecting above the prong retaining member.

3. A roast board comprising: a board having an annular recess therein, a prong retaining member removably positioned in said recess with the prongs projecting above the surface of said board, screws in said board, the heads of said screws projecting above the prong retaining member, and said prong retaining member having notches therein permitting removal of said member when aligned with said screws.

References Cited in the file of this patent

UNITED STATES PATENTS

| | | |
|---|---|---|
| Des. 168,304 | Klein | Dec. 2, 1952 |
| 152,331 | Cass | June 23, 1874 |
| 536,986 | Dunlap | Apr. 2, 1895 |
| 1,344,915 | Love | June 29, 1920 |
| 2,620,003 | Perdue, Jr. | Dec. 2, 1952 |

FOREIGN PATENTS

| | | |
|---|---|---|
| 4,485 | Great Britain | Apr. 11, 1885 |
| 18,494 | Great Britain | Oct. 3, 1893 |
| 160,351 | Great Britain | Mar. 24, 1921 |
| 382,879 | Great Britain | Nov. 3, 1932 |
| 529,268 | Great Britain | Nov. 18, 1940 |